United States Patent [19]

Hista

[11] Patent Number: 4,472,349
[45] Date of Patent: Sep. 18, 1984

[54] REACTOR BUILDING

[75] Inventor: Jean Claude Hista, Versailles, France

[73] Assignee: Framatome, Tour Fiat, Courbevoie, France

[21] Appl. No.: 322,387

[22] Filed: Nov. 17, 1981

[30] Foreign Application Priority Data

Nov. 28, 1980 [FR] France .................. 80 25304

[51] Int. Cl.³ .................. G21C 19/32
[52] U.S. Cl. .................. 376/285; 376/293
[58] Field of Search .................. 376/285, 293, 296

[56] References Cited

U.S. PATENT DOCUMENTS

| 3,454,466 | 7/1966 | Pitt et al. | 376/293 |
| 3,605,362 | 9/1971 | Sweeney | 376/293 |
| 3,748,227 | 7/1973 | Hillekum et al. | 376/293 |
| 3,929,188 | 12/1975 | Brinkmann et al. | 376/293 |

FOREIGN PATENT DOCUMENTS 1965850 7/1971 Fed. Rep. of Germany .
2427446 12/1979 France .
1084064 9/1967 United Kingdom .

Primary Examiner—Sal Cangialosi
Attorney, Agent, or Firm—Pearne, Gordon, Sessions, McCoy, Granger & Tilberry

[57] ABSTRACT

Reactor building comprising a vessel shaft anchored in a slab which is peripherally locked.

This reactor building comprises a confinement enclosure (4) within which are positioned internal structures (14) constituted by an internal structure floor (16), a vessel shaft (18), a slab (22) being positioned between the general floor (8) and the internal structure floor (16), the vessel shaft (18) being anchored in the slab which is peripherally locked against the low part of the confinement enclosure skirt (12), a horizontal sliding joint (24) being positioned between slab (22) and internal structure floor (16).

Application to the construction of the internal structures of a reactor building.

6 Claims, 3 Drawing Figures

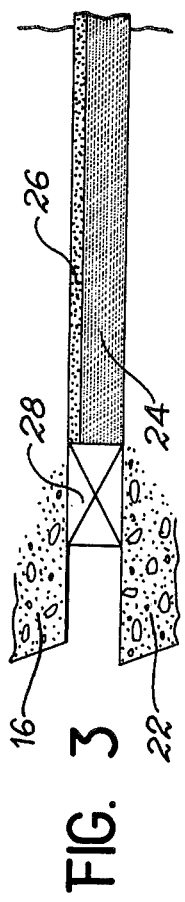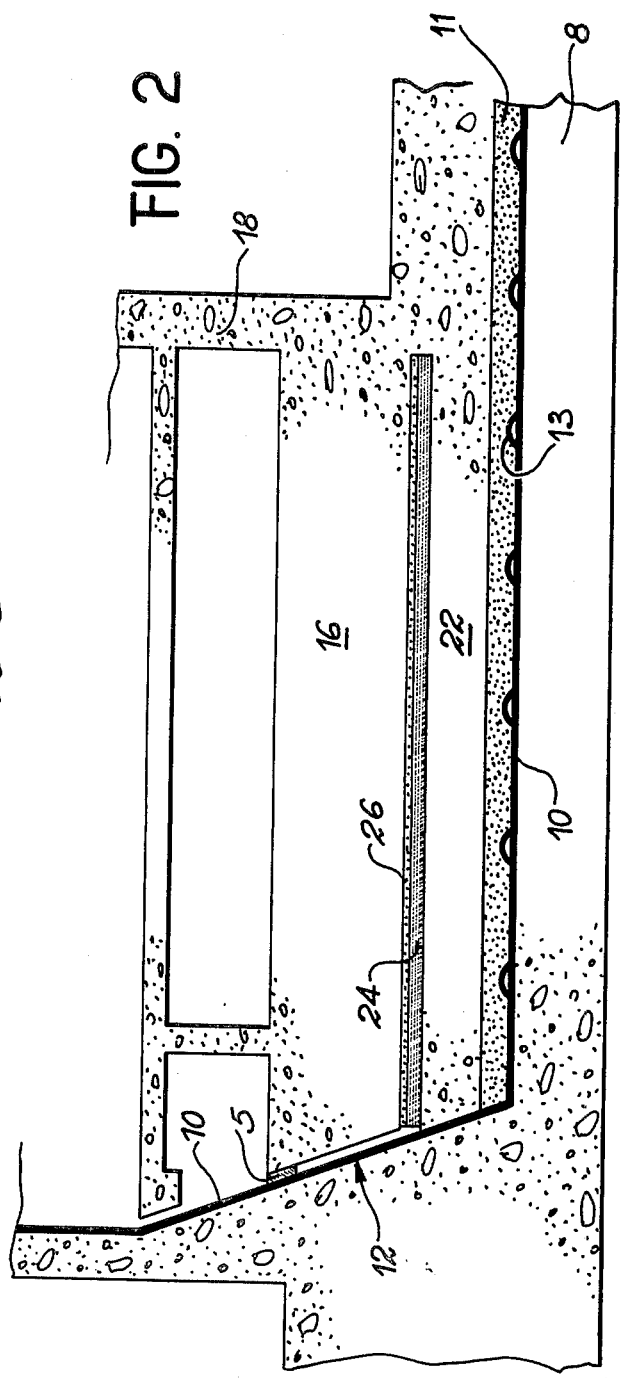

REACTOR BUILDING

BACKGROUND OF THE INVENTION

The present invention relates to a reactor building incorporating a device ensuring the positioning of internal structures, whilst permitting the free thermal expansion thereof.

The building in which a nuclear reactor is installed, called a reactor building, is constituted by a confinement enclosure within which are arranged the internal structures, which support the components of the primary circuits. These structures essentially comprise a floor, called the internal structure floor, a structure called a vessel shaft surrounding and supporting the reactor vessel and hot cells arranged around the vessel shaft. The confinement enclosure prevents any leakage of radioactive substance in the case of an incident and resists the pressure and thermal stresses resulting from a possible fracture to the primary or secondary circuits. The confinement enclosure is constituted by a floor, called the general floor, a cylindrical skirt on the general floor and a dome sealing the upper part of the cylindrical skirt. The confinement enclosure is sealed by a soft steel covering, called a skin.

In the case of an earthquake, it is necessary to prevent any horizontal displacement between the floor of the internal structures and the general floor. It is also advantageous to permit the free expansion of the internal structures from the vessel shaft and relative to the confinement enclosure.

Reactor buildings are known in which the internal structures are locked relative to the general floor by clamping the base of the vessel shaft by means of mechanical stops. The latter are anchored in a concrete slab resting on the general floor. The concrete slab has a recess in the central part of its lower face. A circular boss having a complementary shape made in the general floor engages in the concrete slab recess. Thus, the slab is locked relative to the general floor and consequently the vessel shaft and internal structures are locked relative to the general floor. The confinement enclosure is sealed by a soft steel covering. The latter follows the displacement of the boss formed in the general floor. This system has a complicated construction and also makes it more difficult to produce the tight covering.

BRIEF SUMMARY OF THE INVENTION

The present invention relates to a reactor building, which obviates these disadvantages. According to the invention, the internal structures are positioned relative to the enclosure by anchoring the vessel shaft in a slab peripherally locked against the confinement enclosure.

More specifically, the present invention relates to a reactor building constituted by a confinement enclosure within which are positioned internal structures, the confinement enclosure comprising a cylindrical skirt closed in its upper part by a dome and erected on the general floor, the internal structures being constituted by an internal structure floor, a concrete cylinder called a vessel shaft located substantially in the centre of the internal structure floor and hot cells surrounding the vessel shaft, wherein the cylindrical skirt is connected to the general floor by a low part, whilst defining a small vessel with a flat bottom in which are positioned the said internal structures, a slab being arranged between the general floor and the internal structure floor, the vessel shaft being anchored in the said slab, the periphery of the latter being locked against the low part of the skirt, a horizontal joint constituted by a sliding product being placed in the form of a ring from the vessel shaft between the slab and the internal structure floor.

Preferably, the sliding layer is in the form of polyvinylchloride sheets gelled by means of chrysene oils and plasticized. During the construction of the internal structure floor, it is mechanically protected by a non-reinforced cement mortar cover.

Thus, the construction of the enclosure sealing covering is made easier because the displacement existing in the prior art devices is eliminated.

The centering stops with the complex construction are also eliminated, the internal structures being locked against the low part of the skirt by means of the slab. Finally, the sliding layer permits a free expansion from the vessel shaft of the internal structure floor relative to the slab.

The sliding layer can in itself have an adequate strength to support the internal structure floor. According to a constructional variant, it is also possible to provide supports on the periphery of the slab, between the latter and the internal structure floor, which makes it possible to use a material with lower mechanical characteristics for the sliding layer.

BRIEF DESCRIPTION OF THE DRAWINGS

The invention is described in greater detail hereinafter relative to non-limitative embodiments and the attached drawings, wherein show:

FIG. 2 a part sectional view of the general floor and the internal structure floor.

FIG. 3 a detailed view of a support positioned on the periphery of the slab.

DETAILED DESCRIPTION OF THE PREFERRED EMBODIMENTS

Figure 1:
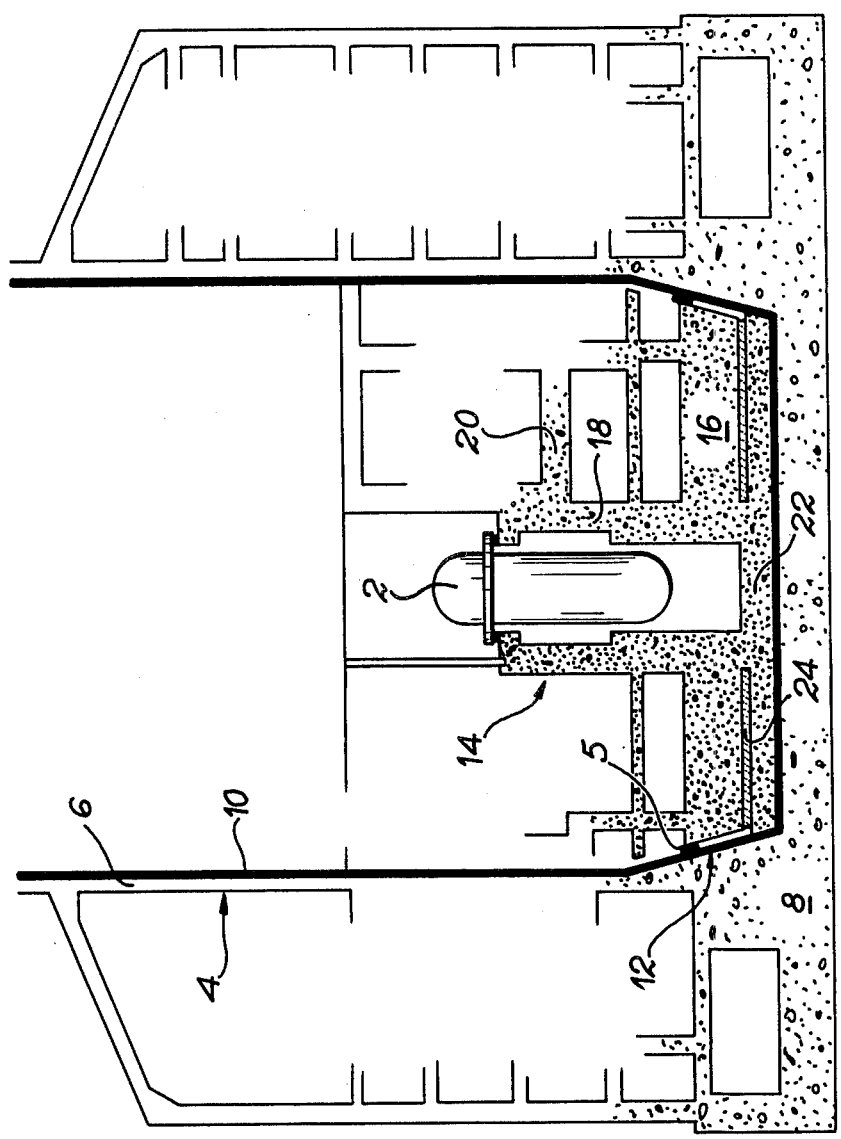
FIG. 1 a sectional view of a reactor building.

FIG. 1 is a sectional view of the nuclear reactor building. The nuclear reactor vessel 2 is arranged within the confinement enclosure 4. This enclosure comprises a cylindrical skirt 6, the general floor 8 and a not shown dome, which seals the upper part of the enclosure. The confinement enclosure 4 is sealed by means of a soft steel covering 10 called a skin. The lower part of the cylindrical skirt 6 is connected to the general floor 8. This connection can be in the form of a frustum-shaped member 12, in the manner shown in FIGS. 1 and 2, but can also have a cylindrical shape. In this way is defined a small vessel with a flat bottom in which are positioned the internal structures. The covering part 10 on general floor 8 consequently has no level displacement.

The internal concrete structures 14 are installed in confinement enclosure 4 and mainly support the components of the primary circuit. They are constituted by the internal structure floor 16, a concrete cylindrical 18 called the vessel shaft which supports the reactor vessel 2 and which is substantially located in the centre of floor 16, and hot cells 20 arranged in radiating manner with respect to the vessel shaft 18 to which they are joined. The internal structures are disengaged from the confinement enclosure 4 and a gasket 5 made from styrene or a similar material is positioned between enclosure 4 and the upper facing of the internal structure floor 16. According to the invention, a slab 22 is placed between the general floor 8 and the internal structure floor 16. Slab 22 is peripherally locked against member 12 of confinement enclosure 14.

Slab 22 prevents any relative horizontal displacement between the internal structure floor and the general floor in the case of an earthquake. A horizontal joint 24 constituting a sliding product is positioned in the form of a ring from vessel shaft 18 between slab 22 and internal structure floor 16 so as to permit the free expansion from shaft 18 of floor 16 under the action of its heating, both in normal operation and in the case of an accident.

FIG. 2 is a part sectional view of the reactor building shown in FIG. 1. Channels coated in a protective concrete layer 11 make it possible to inspect the welds of the sealing skin 10.

The sliding layer 24 is disposed in the form of a ring from vessel shaft 18 between slab 22 and internal structure floor 16. This sliding layer can be constituted by polyvinylchloride sheets gelled with chrysene oils and plasticized. A non-reinforced cement mortar cover 26 cast on the sliding layer 24 ensures the mechanical protection thereof during the construction of the internal structure floor 16.

The arrangements adopted make it possible to limit the thermal stressing of member 12 by slab 22. Thus, with the exception of the part located to the right of vessel shaft 18, slab 22 is insulated from the atmosphere of confinement enclosure 4 by internal structure floor 16.

In addition, the hot part of slab 22 to the right of vessel shaft 18 has a smaller mean diameter than the contact diameter between slab 22 and member 12. Finally, the thickness of slab 22 is as small as is permitted by the seismic forces to be transmitted.

In the embodiment described with reference to FIG. 2, the horizontal sliding joint 24 can in itself have an adequate mechanical strength. However, it is also possible to insert supports 28 between slab 22 and internal structure floor 16 in the manner shown in FIG. 3.

Although these supports permit a relative horizontal movement of the internal structures 14 relative to slab 22, they have the advantage of ensuring a precise positioning of the support reactions of internal structure floor 16 on slab 22 and on general floor 8. They also improve the earthquake stability of internal structures 14 and use a sliding product with lower mechanical characteristics, e.g. polystyrene with a vinyl protection.

According to a first embodiment, the supports 28 are sliding metal supports arranged on the periphery of slab 22. According to a variant, the supports 28 are made from a banded or hooped elastomer.

What is claimed is:

1. A reactor building constituted by a confinement enclosure within which are positioned internal structures, the confinement enclosure comprising a cylindrical skirt closed in its upper part by a dome and erected on the general floor, the internal structures being constituted by an internal structure floor, a concrete cylinder called a vessel shaft located substantially in the centre of the internal structure floor and hot cells surrounding the vessel shaft, wherein the cylindrical skirt is connected to the general floor by a low part, whilst defining a small vessel with a flat bottom in which are positioned the said internal structures, a slab being arranged between the general floor and the internal structure floor, the vessel shaft being anchored in the said slab, the periphery of the latter being locked against the low part of the skirt, a horizontal joint constituted by a sliding product being placed in the form of a ring from the vessel shaft between the slab and the internal structure floor.

2. A reactor building according to claim 1, wherein the sliding layer placed between the slab and the internal structure floor is made from polyvinylchloride sheets gelled with chrysene oils and plasticized, it being mechanically protected during the construction of the internal structure floor by a non-reinforced cement mortar cover.

3. A reactor building according to claim 1, wherein the internal structures rest on supports located at the periphery of the slab, between the latter and the internal structure floor.

4. A reactor building according to claim 3, wherein the sliding layer placed between the slab and the internal structure floor is made from polystyrene provided with a vinyl protection and covered by a non-reinforced cement mortar cover.

5. A reactor building according to claims 3 or 4, wherein the supports provided on the periphery of the slab are made from a banded or hooped elastomer.

6. A reactor building according to claims 3 or 4, wherein the supports arranged on the periphery of the slab are sliding metal supports.

* * * * *